United States Patent [19]
Takahashi et al.

[11] Patent Number: 5,549,740
[45] Date of Patent: Aug. 27, 1996

[54] LIQUID COMPOSITION, INK SET AND IMAGE FORMING METHOD AND APPARATUS USING THE COMPOSITION AND INK SET

[75] Inventors: Katsuhiko Takahashi, Yokohama; Yutaka Kurabayashi, Tokorozawa, both of Japan

[73] Assignee: Canon Kabushiki Kaisha, Tokyo, Japan

[21] Appl. No.: 493,303

[22] Filed: Jun. 21, 1995

[30] Foreign Application Priority Data

Jul. 11, 1994 [JP] Japan .................................. 6-180474

[51] Int. Cl.⁶ .................................................. C09D 11/02
[52] U.S. Cl. .................... 106/20 R; 106/22 R; 106/20 D
[58] Field of Search .............................. 106/20 R, 22 R, 106/20 D

[56] References Cited

U.S. PATENT DOCUMENTS

| | | | |
|---|---|---|---|
| 5,102,459 | 4/1992 | Ritter et al. | 106/22 K |
| 5,149,366 | 9/1992 | Kawashita et al. | 106/22 K |
| 5,169,436 | 12/1992 | Matrick | 106/20 D |
| 5,415,686 | 5/1995 | Kurabayashi et al. | 106/26 R |
| 5,439,515 | 8/1995 | Kurabayashi et al. | 106/20 R |

FOREIGN PATENT DOCUMENTS

| | | |
|---|---|---|
| 55-65269 | 5/1980 | Japan . |
| 55-66976 | 5/1980 | Japan . |
| 63-299971 | 12/1988 | Japan . |
| 64-9279 | 1/1989 | Japan . |
| 64-63185 | 3/1989 | Japan . |

Primary Examiner—Helene Klemanski
Attorney, Agent, or Firm—Fitzpatrick, Cella, Harper & Scinto

[57] ABSTRACT

The present invention provides a liquid composition containing at least a cationic substance and bishydroxyethylsulfone. It also provides a liquid composition containing both a cationic substance having a molecular weight distribution with a peak within the molecular weight region of 1000 or less, and bishydroxyethylsulfone.

The present invention further provides an ink set comprising a combination of the liquid composition and ink, and an image forming-method and apparatus which use the liquid composition and the ink set.

26 Claims, 5 Drawing Sheets

LIQUID COMPOSITION, INK SET AND IMAGE FORMING METHOD AND APPARATUS USING THE COMPOSITION AND INK SET

BACKGROUND OF THE INVENTION

1. Field of the Invention

The present invention relates to a technique of reducing the phenomenon known as color bleeding in the formation of a color image on ordinary paper, and obtaining a water-resistant ink image. The present invention particularly relates to a liquid composition to be used in an image formation process which employs an ink-jet system, to an ink set comprising a combination of the liquid composition and ink, and to image forming methods and apparatus which use the liquid composition and the ink set.

2. Related Background Art

In an ink-jet recording method, recording is performed by ejecting ink droplets and adhering the droplets to a recording medium such as paper. Particularly, in an ink-jet recording method in which bubbles are generated by applying heat energy to an ink using an electrothermal converter as discharge energy supply means, and the bubbles are used to discharge ink droplets, a high density multi-orifice recording head can be readily manufactured and can record high-resolution and high-definition images at a high speed. Such ink jet recording methods have been disclosed in, for example, Japanese Patent Publication Nos. 61-59911, 61-59912 and 61-59914.

However, since the ink used in a conventional ink-jet recording method generally comprises water as the main component, and a water-soluble high-boiling point solvent such as glycol for preventing drying and clogging of the nozzle, the method has the drawbacks that sufficient fixing properties cannot be obtained when recording on ordinary paper using such an ink, and that a nonuniform image is produced, possibly due to nonuniform distribution of filler and sizing agent on the surface of recording sheet. Furthermore, in the case of color recording, when a plurality of color inks are successively superimposed before one of the color inks is fixed to the recording sheet, there is the problem that a satisfactory image cannot be obtained due to color bleeding or nonuniform mixing at the boundary between images having different colors (This phenomenon is referred to as "bleeding" hereinafter).

To enhance the fixing properties, therefore, Japanese Patent Laid-Open No. 55-65269 discloses a method of adding a compound for increasing penetrability, such as a surfactant, to an ink. Japanese Patent Laid-Open No. 55-66976 discloses a method of using an ink comprising a volatile solvent as a main component. However, although the method of adding a surfactant or the like to the ink increases the penetrability of the ink into the recording paper and improves the fixing properties of the ink and decreases bleeding to some extent, the method also causes the problem of decreasing the image density and chroma due to deep penetration of the ink's coloring material into the recording sheet. The method also causes lateral spreading of the ink and consequently causes the problem of deteriorating the edge sharpness or resolution. On the other hand, since the latter method of using an ink comprising a volatile solvent as a main component not only produces the same problems as the former method but also readily produces clogging of a recording head nozzle due to the evaporation of the solvent, it is undesirable.

Methods of adhering a liquid to a recording medium before ejection of the ink in order to improve image quality have been proposed for solving the aforementioned problems.

For example, Japanese Patent Laid-Open No. 63-299971 discloses a method of recording with ink containing an anionic dye after adhering a liquid containing an organic compound having at least two cationic groups per molecule to the recording medium. Japanese Patent Laid-Open No. 64-9279 discloses a method of recording with an ink containing an anionic dye after adhering an acid liquid containing succinic acid or the like to the recording medium. Further, Japanese Patent Laid-Open No. 64-63185 discloses a method of recording with an ink after applying a liquid which makes the dye insoluble.

However, since all of the above methods have been proposed for improving bleeding and water resistance of an image by depositing dyes themselves, these methods do not sufficiently prevent bleeding between different color inks. In addition, since the deposited dyes are liable to be distributed nonuniformly on the recording sheet, the formed image has poor coverage of the pulp fibers of the recording sheet, thereby reducing the uniformity of the image.

SUMMARY OF THE INVENTION

Accordingly, an object of the present invention is to achieve the six following goals.

Two goals regarding ink-jet recording on ordinary paper are:

(1) Improved print quality with maintenance of good fixing properties; and (2) Sufficient image density, and increased uniformity of solid images.

Goals for color image formation on ordinary paper are the above two and the following three goals:

(3) Prevention of bleeding;

(4) High-definition images with good color reproducibility; and (5) Complete water resistance of recorded images.

Goals for thermal ink-jet recording further include the following:

(6) Improved discharge durability of a recording head with respect to a non-ink liquid composition, which is provided for improving image quality.

The above objects can be achieved by the present invention. In accordance with a first aspect of the present invention, there is provided a liquid composition containing at least a cationic substance, and bishydroxyethylsulfone. In a second aspect of the invention, there is provided a liquid composition containing a cationic substance having a molecular weight distribution with a peak in the molecular weight range of 1000 or less, and bishydroxyethylsulfone.

In a third aspect of the invention, there is provided an ink set comprising a combination of a liquid composition in accordance with the first or second aspect of the invention, and at least one of yellow, magenta, cyan, black, red, blue and green inks. In a fourth aspect of the invention, there is provided an ink set comprising a combination of a liquid composition in accordance with the first or second aspect of the invention, and inks of three colors, namely, yellow, magenta and cyan. In a fifth aspect of the invention, there is provided an ink set comprising a combination of a liquid composition in accordance with the first or second aspect of the invention, and inks of four colors, namely, yellow, magenta, cyan and black.

In a sixth aspect of the invention, there is provided an image forming method comprising the steps of (A) of adhering a liquid composition in accordance with the first or second aspect of the invention to at least an image forming region of a recording medium, and (B) applying an ink containing at least an anionic compound to the recording medium by an ink-jet process.

In a seventh aspect of the invention, there is provided an image forming apparatus comprising a first recording unit having a storage portion and discharge means for a liquid composition according to the first or second aspect of the invention, and a second recording unit having a storage portion and discharge means for an ink containing at least an anionic compound.

DESCRIPTION OF THE PREFERRED EMBODIMENTS

The function of the liquid composition of the present invention is described with reference to the FIGS. 9(a)–9(e).

Figure 9A:
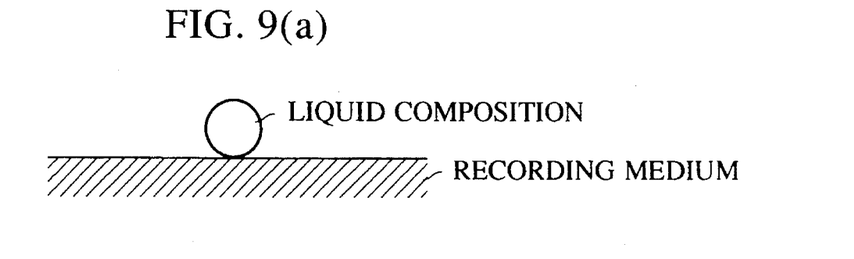
FIGS. 9a–9e illustrate steps of an image-forming method in accordance with the present invention.
Figure 9B:
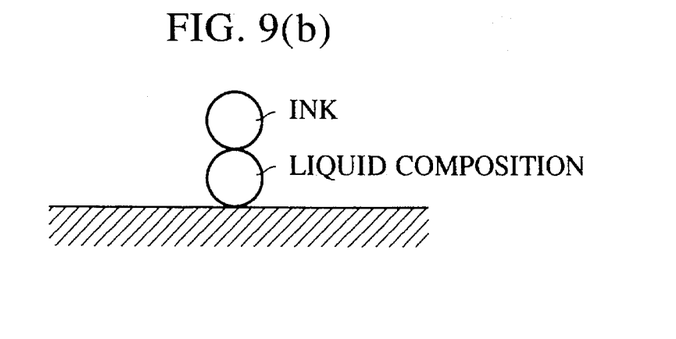
Figure 9C:
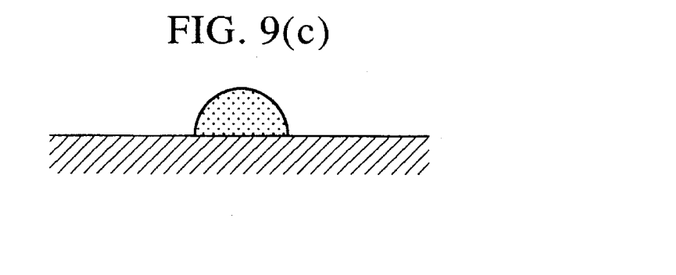

A liquid composition containing cationic substances in accordance with the present invention is used together with, for example, an ink containing a dye having an anionic group as a coloring material. The liquid composition is applied to the recording medium (FIG. 9(a)). When the liquid composition is mixed with the ink on a recording sheet or where they penetrate into the recording sheet, (FIG. 9(b)) the low-molecular weight component of the cationic substances contained in the liquid composition associates with the anionic compound in the ink due to ionic interaction in the first stage of reaction. The dye instantaneously aggregates and separates from the solution phase, as shown in FIG. 9(c). Thus, the first state of reaction produces small aggregates.

Figure 9D:
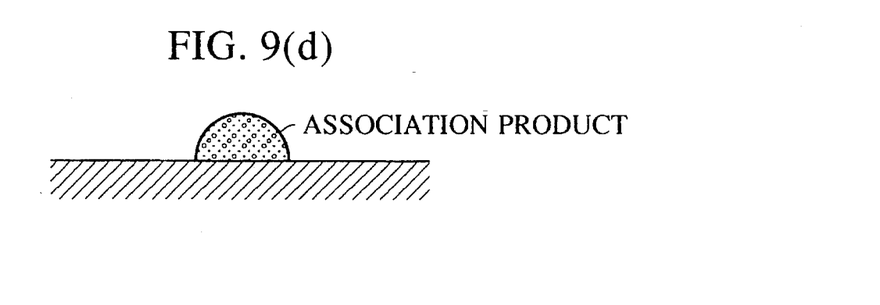
Figure 9E:
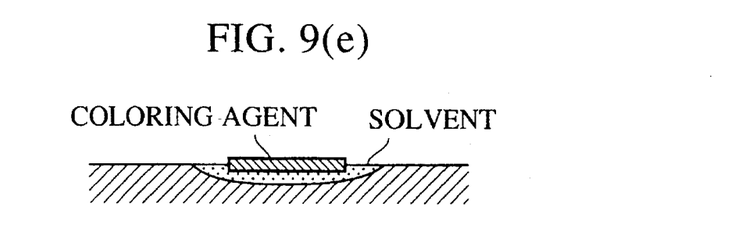

In the second stage of reaction, since the association product of the anionic compound and the low-molecular weight cationic substance is adsorbed by a high-molecular weight component contained in the liquid composition, the size of the aggregates containing the dye produced by association is further increased as shown in FIG. 9(d). This makes it difficult for the dye to penetrate between the fibers of the recording sheet. As a result, solid-liquid separation occurs, and thus only the liquid portion penetrates into the recording sheet as shown in FIG. 9(e) Consequently, improvements in both print quality and fixing properties can be achieved.

At the same time, the viscosity of the aggregates, produced by the above-described mechanism and consisting of the low-molecular weight cationic substance, the anionic compound and the high-molecular weight component contained in the liquid composition, is increased. As a result, since the aggregates do not move with the liquid medium, if adjacent dots are formed by different color inks, the dots are not mixed with each other. Therefore, no bleeding occurs, unlike the above-described conventional methods of forming full-color images. Further, because the aggregates are essentially water-insoluble, the formed image has complete water resistance. Also, the light fastness of the formed image is improved due to the shielding effect of the high-molecular weight component contained in the liquid composition.

The present invention is described in further detail below with reference to preferred embodiments of the invention.

The liquid composition of the present invention contains at least cationic substances and bishydroxyethylsulfone as an essential component. In a more preferred embodiment, the liquid composition shows the molecular weight distribution, as measured by GPC having at least peaks within the molecular weight regions 1 and 2 described below. Although any cationic substances which permit the achievement of the objects of the invention can be used, it is preferable that the cationic substances contained in the liquid composition respectively show molecular weight distributions with peaks within the molecular weight regions 1 and 2 described below. Particularly, it is preferable to use at least two types of cationic substances having molecular weight distributions with peaks within different molecular weight regions:

1. A low-molecular weight cationic substance having a peak within the region of weight average molecular weights of 1,000 or less in the molecular weight distribution measured by GPC.

2. A high-molecular weight nonionic or cationic substance having a molecular weight distribution, as measured by GPC, with a peak within the region of weight average molecular weights of 1,500 to 10,000.

In the present invention, the weight average molecular weight represents a weight average molecular weight in terms of polyethylene oxide unless otherwise provided.

An ink set of the present invention comprises the above-described liquid composition of the present invention, and preferably comprises an ink containing a dye containing at least an anionic group or an ink containing at least an anionic compound and a pigment as a color ink used for recording together with the liquid composition.

The components of the liquid composition of the present invention are described. Although the content of bishydroxyethylsulfone as an essential component in the liquid composition of the invention is not limited so long as the object of the present invention can be achieved, its content in the liquid composition is preferably 5 to 40% by weight. The addition of bishydroxyethylsulfone to the liquid composition decreases the foaming temperature of the liquid composition when it is discharged in a thermal ink-jet recording system where droplets are discharged by the heat energy generated by applying a recording signal to a recording ink in a recording head. Therefore, when the liquid composition contains an organic compound, it is possible to effectively prevent burning of the organic compound on the heating head. As a result, the discharge durability of the heating head can be improved, and stable discharge can be made.

Since the liquid composition contains cationic substances, when it is mixed with an ink on the recording medium, an association product is first formed due to the ionic interaction between the low-molecular weight cationic substance having a molecular weight distribution with a peak within the molecular weight region 1 of 1,000 or less and the anionic compound contained together with a coloring material in the ink. The association product must be formed at a very low reaction rate.

The low-molecular weight cationic substance having a molecular weight distribution with a peak within the region 1 of 1,000 or less is described below. Typical examples of such cationic substances which can be used include primary, secondary and tertiary amine salt compounds such as hydrochlorides and acetates of lauryl amine, coconut amine, stearyl amine, rosin amine and the like; quaternary ammonium salt compounds such as lauryltrimethylammonium chloride, lauryldimethylbenzylammonium chloride, benzyltributylammonium chloride, benzalkonium chloride and the like; pyridinium salt compounds such as cetylpyridinium chloride, cetylpyridinium bromide and the like; imidazoline cationic compounds such as 2-heptadecenyl-hydroxyethylimidazoline and the like; ethylene oxide addition products of higher alkyl amines such as dihydroxyethylstearylamine and the like.

In the present invention, amphoteric surfactants exhibiting the cationic properties within a particular pH region can also preferably be used as low-molecular cationic substances. Examples of such surfactants include amino acid type amphoteric surfactants; $R-NH-CH_2-CH_2-COOH$ type compounds; betaine compounds such as carboxylate type amphoteric surfactants such as stearyldimethyl betaine, lauryidihyroxyethyl betaine and the like; other amphoteric surfactants such as sulfate, sulfonic acid, phosphate type surfactants and the like. When such amphoteric surfactants are used, it is necessary to adjust the pH of the liquid composition of the present invention to a value below its isoelectric point, or to adjust the pH of the liquid composition to a pH value below the isoelectric point when mixed with the ink on the recording medium.

Cationic substances which can be used in the present invention are not limited to the low molecular weight cationic substances exemplified above. Other examples of cationic substances which can be used in the present invention include monomers or oligomers of the high-molecular weight cationic substances below.

The low molecular weight cationic substance preferably has a molecular weight distribution with a peak within the molecular weight region of 100 to 700.

A high-molecular weight nonionic or cationic substance having a molecular weight distribution with a peak within the molecular weight region 2 of 1,500 to 10,000 has the above-described function and effect. Namely, in the second stage of reaction between the liquid composition and the ink, this substance adsorbs, at the molecular level, the association product of the dye having an anionic group and the low-molecular weight cationic substance having a peak within molecular weight region 1. This consequently increases the size of the dye aggregates produced by association, thereby making it difficult for them to penetrate into the spaces between the fibers of the recording sheet. Thus, since only the liquid portion produced by solid-liquid separation penetrates into the recording sheet, improvement in both printing quality and fixing properties can be achieved.

Examples of such high-molecular weight nonionic substances within the molecular weight region 2 having the above-described function and effect, which can be used, include polyvinyl alcohol, polyvinyl pyrrolidone and water-soluble cellulose and the like. However, the high-molecular weight substances are not limited these substances. Further examples of cationic substances include polyalkylamine hydrochlorides, polyaminesulfone hydrochlorides, polyvinylamine hydrochlorides, chitosan acetate and the like. As a matter of course, however, the cationic substances are not limited to these substances.

Nonionic high-molecular weight substances which are made partly cationic may be used as the high-molecular weight cationic substances within the molecular weight region 2 in the present invention. Examples of such high-molecular weight substances include copolymers of vinylpyrrolidone and aminoalkylalkylate quaternary salts, copolymers of acrylamide and aminomethylacrylamide quaternary salts and the like. The high-molecular weight substances are, of course, not limited to these substances.

Although ideally the high-molecular weight substances and high-molecular weight cationic substances are water-soluble, these substances may be a dispersion such as a latex or emulsion.

It is preferable for carrying out the present invention that the above high-molecular weight cationic substances preferably have molecular weight distributions with peaks within the molecular weight region of 1,500 to 10,000. However, it is more preferable with respect to preventing deterioration of the coloring properties of the coloring material (such as a dye) to use a compound having a peak within the lower molecular weight region of 1,500 to 7,000.

When the liquid composition is applied to the recording medium by an ink-jet recording head, the cationic substance having a molecular weight distribution with a peak in the lower molecular weight region 1 keeps the solution viscosity at a low level, even if its content is increased, and this substance also has the advantage of maintaining good discharge properties of the liquid composition.

The amount of each of the above cationic substances contained in the liquid composition of the present invention preferably is within the range of 0.05 to 20% by weight, and more preferably within the range of 0.5 to 10% by weight. However, the optimum range must be selected according to the combination of the substances used. When two types of cationic substances respectively having molecular weight distributions with peaks within the different regions 1 and 2 are contained in the liquid composition of the present invention, the mixing ratio by weight of the low-molecular weight cationic substance 1 and the high-molecular weight cationic substance 2 contained in the liquid composition is within the range of 10:1 to 1:10, preferably within the range of 5:1 to 1:5. With a mixing ratio of over 10:1, sufficient water resistance cannot be easily obtained. Conversely, with a mixing ratio of less than 1:10, bleeding is not sufficiently suppressed, and at the same time, the sharpness of dot edges deteriorates readily.

The molecular weight distribution of the cationic substances used in the present invention may be measured by GPC, or by the following method. After the molecular weight distribution of the liquid composition itself is measured, the liquid composition is mixed and agitated with a sufficient amount of ink containing a dye having at least an anionic group in a beaker. Precipitates are then removed, followed by GPC measurement again. The results of GPC measurements before mixing with the ink and after mixing with the ink and removal of precipitates are compared to determine the molecular weight distribution of the component precipitated by the dye contained in the ink and removed from the system.

Other components of the liquid composition of the present invention are described in detail below. The liquid composition of the present invention generally contains water, a water-soluble organic solvent and appropriate additives other than the above-described cationic substances 1 and 2. It may also contain a nonionic polymer. Examples of water-soluble organic solvents which can be used include amides such as dimethylformamide, dimethylacetamides and the like; ketones such as acetone and the like; ethers such as tetrahydrofuran, dioxane and the like; polyalkylene glycols such as polyethylene glycol, polypropylene glycol and the like; alkylene glycols such as ethylene glycol, propylene glycol, butylene glycol, triethylene glycol, 1,2,6-hexanetriol, thiodiglycol, hexylene glycol, diethylene glycol and the like; lower alkyl ethers of polyhydric alcohols such as ethylene glycol methyl ether, diethylene glycol monomethyl ether, triethylene glycol monomethyl ether and the like; monohydric alcohols such as ethanol, isopropyl alcohol, n-butyl alcohol, isobutyl alcohol and the like; glycerin; N-methyl-2-pyrrolidone; 1,3-dimethyl-imidazolidinone; triethanolamine; sulfolane; dimethylsulfoxide and the like. Examples of non-ionic polymers include polyvinylalcohol, polyvinylpyrrolidone, polyvinylacetal, polyacrylamide, etc.

Although the content of the water-soluble organic solvent is not limited, it is present preferably within the range of 5 to 60% by weight, more preferably 5 to 40 % by weight, of the total amount of the liquid composition.

The liquid composition of the present invention may further contain appropriate additives such as a viscosity modifier, a pH adjustor, a preservative, various surfactants, an antioxidant, an evaporation accelerator. Selection of a surfactant is particularly important for adjusting the penetrability of the liquid into the recording medium.

The liquid composition of the present invention is preferably colorless, but it may have a light color which causes no change in tone of any of the color inks mixed with it on the recording medium. The liquid composition also has various physical properties such as a pH within the range of 3 to 12, preferably the range of 3 to 8, more preferably the range of 3 to 5; a surface tension within the range of 10 to 60 dyne/cm, more preferably within the range of 10 to 40 dyne/cm; and a viscosity within the range of 1 to 30 cps. The surface tension of the liquid composition of the present invention is preferably lower than the surface tension of the inks used therewith, as described below.

An ink which forms an ink set of the present invention is described below.

The ink used in the present invention contains as a coloring material a water-soluble dye having an anionic group, or when a pigment is used as a coloring material, an anionic compound is combined with the ink. The above ink used in the present invention further contains water, a water-soluble organic solvent and other components such as a viscosity modifier, a pH adjustor, a preservative, a surfactant, and/or an antioxidant, as necessary.

Any of the water-soluble acid dyes, direct dyes and reactive dyes described in The Color Index and having an anionic group can be used as the water-soluble dye of the present invention. Dyes which are not described in The Color Index and which have an anionic group, e.g., a sulfone or carboxyl group, can also be used without limitation. Such water-soluble dyes, of course, include dyes having pH-dependent solubility.

The same water-soluble organic solvents as those used for the liquid composition of the present invention can be used as water-soluble organic solvents contained in inks which contains water-soluble dye as a coloring material. The preferable content range of the water-soluble organic solvent in the ink is the same as that of the liquid composition, and the preferable ranges of physical properties of the ink are also the same as those of the liquid composition. However, it is sometimes effective and preferable for carrying out the image-forming method of the present invention that the surface tension of the ink to be higher than that of the liquid composition. This is possibly because when the surface tension of the ink is higher than that of the liquid composition, the liquid composition first ejected, for example, in a printing process, causes uniformity of wettability of the ink subsequently ejected onto the recording medium. However, details of this phenomenon are not clear.

When a pigment is used as a coloring material in the ink used in the present invention, the amount of the pigment used is within the range of 1 to 20% by weight, preferably within the range of 2 to 12% by weight, of the total weight of the ink.

An example of a pigment used for a black ink in the present invention is carbon black. For example, carbon black produced by a furnace method or a channel method and wherein the primary particle size is 15 to 40 μm, the specific surface area measured by BET (Brunauer-Emmett-Teller) method is 50 to 300 $m^2/g$, the DBP (Dibutylphthalate) oil absorption is 40 to 150 ml/100 g, the volatile component is 0.5 to 10%, and the pH value is 2 to 9 is preferably used. Examples of commercially available carbon black having such properties include No. 2300, No. 900, MCF88, No. 33, No. 40, No. 45, No. 52, MA7, MA8 and No. 2200B (produced by Mitsubishi Kasei); RAVEN1255 (produced by Colombia); REGAL400R, REGAL330R, REGAL660R and MOGUL L (produced by Cabot); Color Black FW1, Color Black FW18, Color Black S170, Color Black S150, Printex 35 and Printex U (produced by Degusa).

Examples of pigments used for a yellow ink include C. I. Pigment Yellow 1, C. I. Pigment Yellow 2, C. I. Pigment Yellow 3, C. I. Pigment Yellow 13, C. I. Pigment Yellow 16, C. I. Pigment Yellow 83 and the like. Examples of pigments used for a magenta ink include C. I. Pigment Red 5, C. I. Pigment Red 7, C. I. Pigment Red 12, C. I. Pigment Red 48 (Ca), C. I. Pigment Red 48 (Mn), C. I. Pigment Red 57 (Ca), C. I. Pigment Red 112, C. I. Pigment Red 122 and the like. Examples of pigments used for a cyan ink include C. I. Pigment Blue 1, C. I. Pigment Blue 2, C. I. Pigment Blue 3, C. I. Pigment Blue 15:3, C. I. Pigment Blue 16, C. I. Pigment Blue 22, C. I. Vat Blue 4, C. I. Vat Blue 6 and the like. Pigments which can be used are not limited to these pigments, and pigments which are newly produced for the present invention can of course be used.

Any water-soluble resin can be used as a dispersant to be contained in an ink when a pigment is used, but resins having a weight average molecular weight within the range of 1,000 to 30,000, more preferably within the range of 3,000 to 15,000, can preferably be used. Examples of such dispersants include block copolymers, random copolymers, graft copolymers and salts thereof comprising at least two monomers (at least one of which is a hydrophilic monomer) selected from styrene, styrene derivatives, biphenylnaphthalene, biphenylnaphthalene derivatives, aliphatic alcohol esters of α, β-ethylenic unsaturated carboxylic acids, acrylic acid, acrylic acid derivatives, maleic acid, maleic acid derivatives, itaconic acid, itaconic acid derivatives, fumaric acid, fumaric acid derivatives, vinyl acetate, vinylpyrrolidone, acrylamide and derivatives thereof. Natural resins such as rosin, shellac, starch and the like can also preferably be used. These resins are soluble in an aqueous solution in which a base is dissolved, and alkali-soluble resins. The content of such a water-soluble resin used as a pigment dispersant is preferably within the range of 0.1 to 5% by weight of the total weight of the ink used.

For an ink containing any of the above-described pigments, the pH of the entire ink is preferably adjusted to be neutral or alkali. Since this adjustment can improve the solubility of the water-soluble resin used as a pigment dispersant and form an ink excellent in long-term storage properties, this is preferred. However, in this case, the ink is preferably adjusted to a pH value within the range of 7 to 10 because an alkali ink sometimes causes corrosion of various members of the ink-jet recording apparatus.

Examples of pH adjustors used in the above-described pH adjustment include various organic amines such as diethanolamine, triethanolamine and the like; inorganic alkali agents such as hydroxides of alkali metals such as sodium hydroxide, lithium hydroxide, potassium hydroxide and the like; organic acids; mineral acids and the like. The pigment and water-soluble resin used as a dispersant are dispersed or dissolved in an aqueous liquid medium.

An aqueous liquid medium preferable for the ink containing a pigment and used in the present invention is a solvent mixture of water and a water-soluble organic solvent. It is preferable to use ion-exchanged water (deionized water), instead of water containing various ions.

Examples of water-soluble organic solvents used in a mixture with water include alkyl alcohols having 1 to 4 carbon atoms, such as methyl alcohol, ethyl alcohol, n-propyl alcohol, isopropyl alcohol, n-butyl alcohol, sec-butyl alcohol, tert-butyl alcohol and the like; amides such as dimethylformamide, dimethylacetamide and the like; ketones or keto alcohols such as acetone, diacetone alcohol and the like; ethers such as tetrahydrofuran, dioxane and the like; polyalkylene glycols such as polyethylene glycol, polypropylene glycol and the like; alkylene glycols each having an alkylene group having 2 to 6 carbon atoms, such as ethylene glycol, propylene glycol, butylene glycol, triethylene glycol, 1,2,6-hexanetriol, thiodiglycol, hexylene glycol, diethylene glycol and the like; glycerin; lower alkyl ethers of polyhydric alcohols such as ethylene glycol monomethyl (or ethyl) ether, diethylene glycol methyl (or ethyl) ether, triethylene glycol monomethyl (or ethyl) ether and the like; N-methyl- 2-pyrrolidone; 2-pyrrolidone; 1,3-dimethyl-2-imidazolidinone and the like. Of these water-soluble organic solvents, polyhydric alcohols such as diethylene glycol, and lower alkyl ethers of polyhydric alcohols such as triethylene glycol monomethyl (or ethyl) ether and the like are preferred.

The content of the water-soluble organic solvent in the ink is generally within the range of 3 to 50% by weight, preferably within the range of 3 to 40% by weight, of the total weight of the ink. The content of the water used is within the range of 10 to 90% by weight, preferably within the range of 30 to 80% by weight, of the total weight of the ink.

The ink used in the present invention and containing a pigment can appropriately contain, in addition to the above-described components, a surfactant, a defoaming agent, a preservative, etc., for obtaining desired physical properties, as needed. In addition to the above-described water-soluble dye, a pigment can appropriately be added as a coloring material. When the ink containing a pigment is used, the surface tension of the ink is preferably higher than the surface tension of the liquid composition of the present invention, and thus the surface tension of the ink is preferably adjusted as described above by adjusting the amount of the surfactant or the like which is contained in the ink.

The method of forming an ink containing the pigment comprises adding a pigment to an aqueous medium containing at least a water-soluble resin as a dispersant and water, agitating the resultant mixture and then dispersing it by using the dispersion means below, and if required, performing centrifugal separation to obtain the desired dispersion. Then, a sizing agent and appropriate additive components are added and the dispersion is agitated to obtain the ink used in the present invention.

When such an alkali-soluble resin as described above is used as a dispersant, a base must be added for dissolving the resin. Examples of such bases which can preferably be used include organic amines such as monoethanolamine, diethanolamine, triethanolamine, amine methylpropanol, ammonia and the like; inorganic salts such as potassium hydroxide, sodium hydroxide and the like.

In the method of forming the ink containing a pigment, it is effective to perform premixing by agitation for 30 minutes of the aqueous medium containing a pigment before the dispersion treatment. The premixing operation is preferable because it improves the wettability of the pigment surfaces, and promotes adsorption of the dispersant to the pigment surfaces.

Any dispersion machines which are generally used can be used for the dispersion treatment of the pigment. Examples of dispersion machines which can preferably be used include a ball mill, a roll mill, a sand mill and the like. Of these machines, a high-speed sand mill is preferably used. Super Mill, Sand Grinder, Beads Mill, Agitator Mill, Grain Mill, Dyno Mill, Pearl Mill and Cobol Mill (all of which are trade names) are examples of high-speed sand mills.

When the ink containing a pigment is used in the ink-jet recording method, a pigment having an optimum particle size distribution is used in order to prevent clogging. Methods of obtaining a pigment having a desired particle size distribution include decreasing the size of the grinding medium for a dispersion machine, increasing the packing rate of the grinding medium, increasing the treatment time, decreasing the discharge speed, classifying particles by a filter or a centrifugal separator after grinding, and combinations of these methods.

In the present invention, when an ink containing a pigment is used, it is preferable to add to the ink an anionic compound such as an anionic surfactant or an anionic polymer substance in addition to the above-described components. In a preferred embodiment, an anionic surfactant is adjusted to a pH higher than its isoelectric point, and then added to the ink. Examples of such anionic surfactants which can preferably be used include carboxylates, sulfates, sulfonates, phosphates and the like. Examples of anionic polymers include alkali-soluble resins such as sodium polyacrylate, polymers which are partly copolymerized with acrylic acid, and the like. Other anionic compounds are can also be used.

The image-forming method of the present invention is described below. The image-forming method of the present invention comprises step (A) of adhering the above-described liquid composition to an image-forming region or an image-forming region and its vicinity, and step (B) of ejecting droplets of an ink containing a dye having at least an anionic group, or an ink containing at least an anionic compound and a pigment from a discharge orifice to a recording medium in response to a recording signal.

In the present invention, "image-forming region" means a region to which ink dots are adhered, and "vicinity of the image-forming region" means a region having a width corresponding to 1 to 5 dots outside the region to which ink dots are to be adhered.

Any image-forming method can be used in the present invention as long as it provides for coexistence of the liquid composition of the invention and the ink on the recording medium. Therefore, it does not matter whether the liquid composition or the ink is first applied to the recording medium. When the liquid composition is first applied to the recording medium, the time from adhesion of the liquid composition to the recording medium to adhesion of the ink to the recording medium is not limited. However, the ink is preferably adhered substantially at the same time as or within several seconds after adhesion of the liquid composition.

The recording medium used in the above image forming method is not limited, and conventionally used plain paper such as copy paper, bond paper and the like can preferably be used. Special coated paper produced for ink-jet recording and OHP (over head projection) transparent films can also preferably be used. Superior paper and glossy paper can also preferably be used.

The liquid composition may be applied to the entire surface of the recording medium by spraying or by a roller. However, it is more preferable to employ an ink-jet process in which the liquid composition can be adhered selectively and uniformly to only the image-forming region to which the ink is or will be adhered or the image-forming region and its vicinity. In this case, various ink-jet recording systems can be used, but a system of discharging droplets by the bubbles generated by heat energy is particularly preferable.

Figure 1:
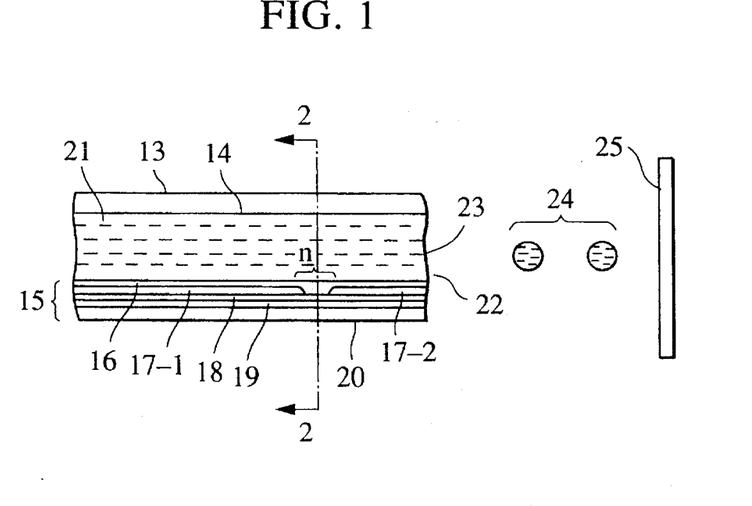
FIG. 1 is a longitudinal cross-sectional view of a head portion of an ink-jet recording apparatus.
Figure 2:
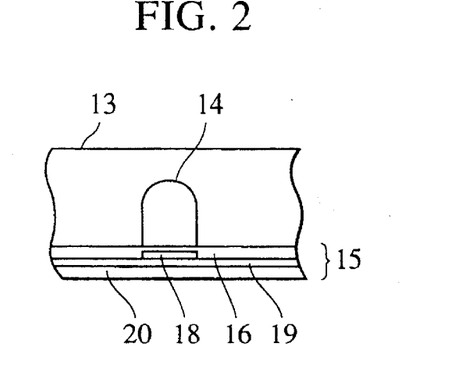
FIG. 2 is a lateral cross-sectional view of a head portion of an ink-jet recording apparatus.
Figure 3:
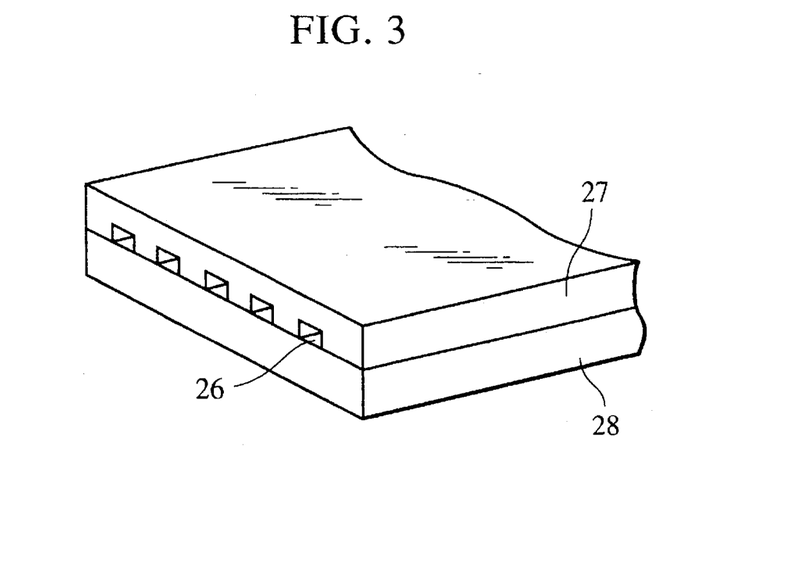
FIG. 3 is a perspective view of a head portion of an ink-jet recording apparatus.

A recording apparatus which is preferably used for the image forming method of the present invention is described below. The present invention preferably employs an ink-jet recording process of the on-demand type, in particular, one in which droplets are discharged by the heat energy generated when a recording signal is applied to an ink in a recording head. FIGS. 1, 2 and 3 show the construction of a recording head which is an essential portion of such a recording apparatus.

A head 13 is formed by bonding a glass, ceramic or plastic plate in which an ink passage is formed, to a heating head 15 (a heating head is not limited to that shown in the drawings) having a heating resistor used for heat-sensitive recording. The heating head 15 comprises a protective film consisting of silicon oxide or the like, aluminum electrodes 17-1 and 17-2, a heating resistor layer 18 consisting of nichrome, a heat accumulating layer 19, and a substrate 20 consisting of alumina or the like exhibiting good heat radiation.

An ink 21 reaches a discharge orifice 22 and forms a meniscus 23 under pressure P.

When an electric signal is applied to the electrodes 17-1 and 17-2, a portion n of the heating head 15 rapidly generates heat, and bubbles are produced in the ink 21 in contact with the portion n. The meniscus 23 is discharged as recording liquid droplets 24 from the orifice 22 due to the pressure generated. The droplets 24 are ejected to a recording material 25. FIG. 3 is a schematic drawing showing a recording head in which many nozzles shown in FIG. 1 are arranged. The recording head comprises a glass plate 27 having many passages and the same heating head 28 as that shown in FIG. 1, which are bonded to each other.

Besides, in the drawings, reference numeral 14 denotes a groove, reference numeral 16 denotes a protection layer, and reference numeral 26 denote multi-grooves.

FIG. 1 is a sectional view of the head 13 taken along the ink flow passage, and FIG. 2 is a sectional view taken along line 2—2 of FIG. 1.

Figure 4:
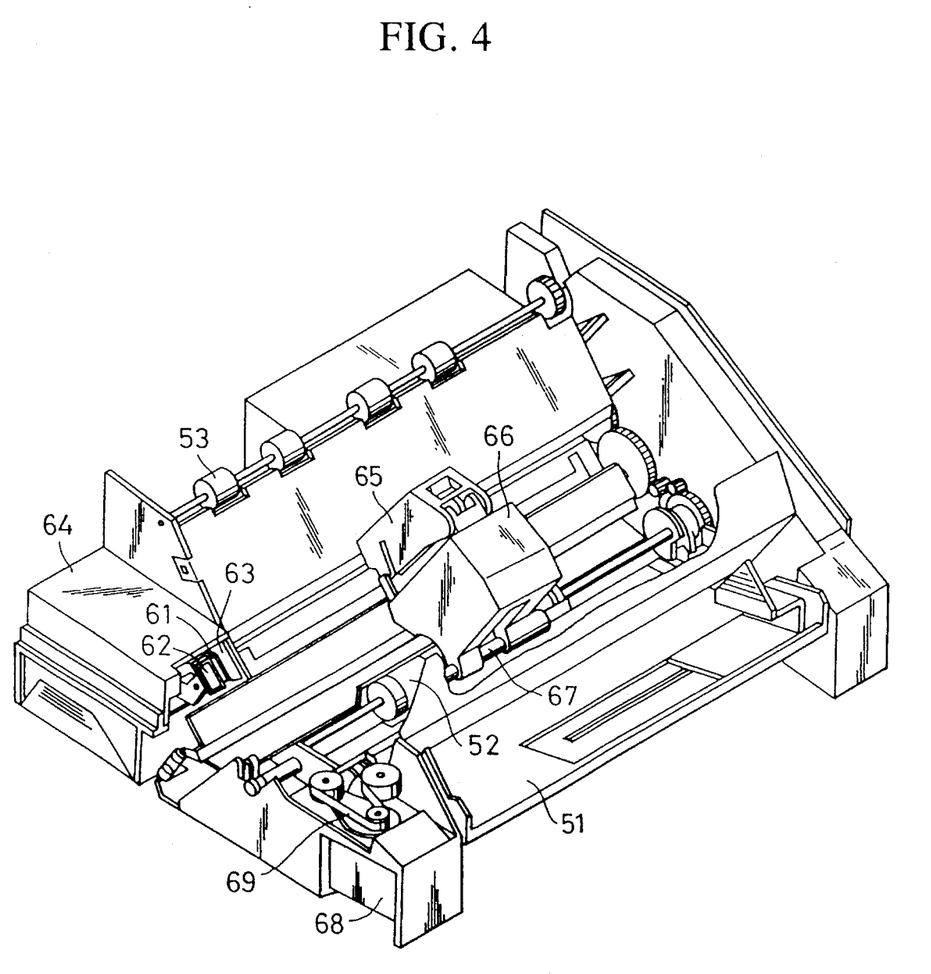
FIG. 4 is a perspective view of an example of an ink-jet recording apparatus.

FIG. 4 shows an example of an ink-jet recording apparatus in which the head is assembled.

In FIG. 4, a blade 61 is a wiping member in a cantilever form in which one end thereof is a fixed and held by a blade holding member. The blade 61 is disposed adjacent to the region of recording by the recording head so as to move in the direction perpendicular to the direction of movement of the recording head. A cap 62 is used for capping a discharge orifice surface in contact therewith. An ink absorber 63 is provided adjacent to the blade 61 and, like the blade 61, is held so as to project into the path of movement of the recording head. The blade 61, the cap 62, and the absorber 63 form a discharge recovery portion 64, and the blade 61 and the absorber 63 function to remove moisture and dust from the ink discharge orifice surface.

A recording head 65 has discharge energy generation means, for recording by discharging the ink to a recording material opposite to the discharge orifice surface on which discharge orifices are arranged. Carriage 66 moves the recording head 65 mounted thereon. The carriage 66 is oscillatably engaged with a guide shaft 67 and is partly connected (not shown) to a belt 69 driven by a motor 68. This permits the movement of the carriage 66 along the guide shaft 67 and the movement by the recording head 65 within the region of recording and the region adjacent thereto.

A feeding portion 51 is used for inserting a recording material. A feed roller 52 is driven by a motor (not shown). In this structure, the recording material is fed to a position opposite to the discharge orifice surface of the recording head, and is delivered to a delivery portion provided with delivery rollers 53 as recording progresses.

In the above-described construction, when the recording head 65 returns to a home position at the end of recording, cap 62 of the head recovery portion 64 is retracted from the path of movement of the recording head 65, While the blade 61 is projected into the path of movement. As a result, the discharge orifice surface of the recording head is wiped. When the discharge orifice surface of the recording head 65 is capped with the cap 62, the cap is moved so as to project into the path of movement of the recording head 65.

When the recording head 65 is moved from the home position to the recording start position, the cap 62 and the blade 61 are at the same positions as they are in wiping operation. As a result, in this movement, the discharge orifice surface of the recording head 65 is also wiped.

The recording head is moved to the home position not only when recording is completed and for discharge recovery, but it is also moved to the home position adjacent to the recording region at predetermined intervals during the movement of the recording head for recording within the recording region. The wiping operation is performed in conjunction with this movement to the home position.

Figure 5:
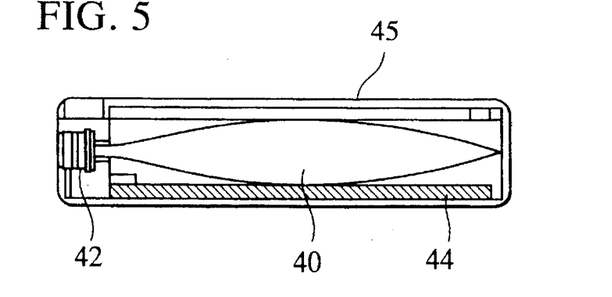
FIG. 5 is a longitudinal cross-sectional view of an ink cartridge.

FIG. 5 illustrates an example of an ink-cartridge 45 for containing an ink to be supplied to the head through an ink supply member, for example, a tube. In FIG. 5, an ink-containing portion 40, for example, an ink bag, contains an ink to be supplied. A rubber stopper 42 is provided at the end of the ink-containing portion. A needle (not shown) is inserted into the stopper 42 so that the ink contained in the ink bag-containing 40 can be supplied to the head. An absorber 44 receives waste ink.

The ink-containing portion preferably has an ink contact surface made of a polyolefin, particularly, polyethylene.

Figure 6:
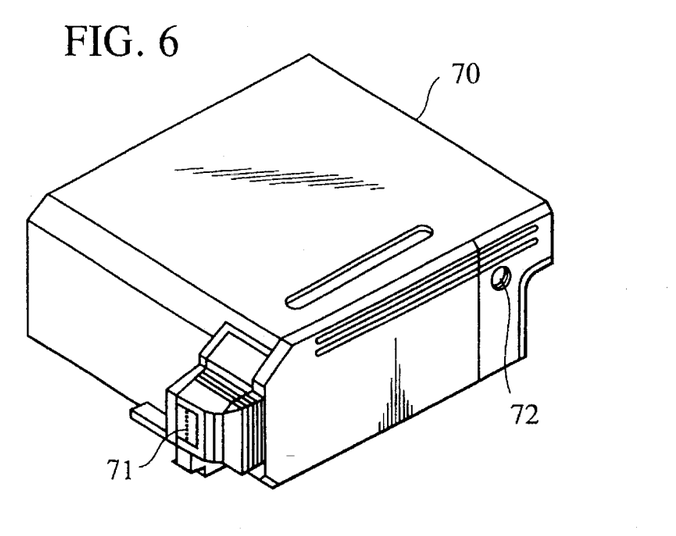
FIG. 6 is a perspective view of a recording unit.

An apparatus in which the head and the ink cartridge are integrated as shown in FIG. 6 can preferably be used as the ink-jet recording apparatus in the present invention, as well as an apparatus in which the head and the ink cartridge are separately provided, as described above.

In FIG. 6, a recording unit 70 contains an ink-containing portion, for example, an ink absorber, for containing an ink. The ink contained in the ink absorber is discharged as ink droplets from a head portion 71 having a plurality of orifices. For example, polyurethane can be used as a material for the ink absorber. An atmospheric communication hole 72 communicates the inside of the recording unit with the atmosphere. This recording head 70 can be used in place of the recording head shown in FIG. 4, and is detachable from the carriage 66. Although an ink-jet recording apparatus in which heat energy is applied to an ink to discharge ink droplets is used as an example of the recording apparatus used in the present invention, another ink-jet recording apparatus of the piezo type which uses a piezoelectric element can alternatively be used in the same manner.

Figure 7:
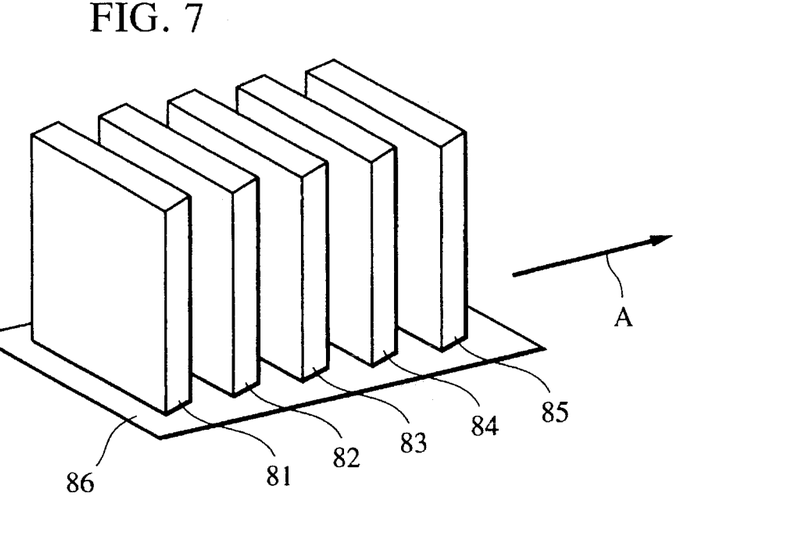
FIG. 7 is a perspective view of a recording portion in which a plurality of recording heads used in embodiments of the present invention are arranged.
Figure 8:
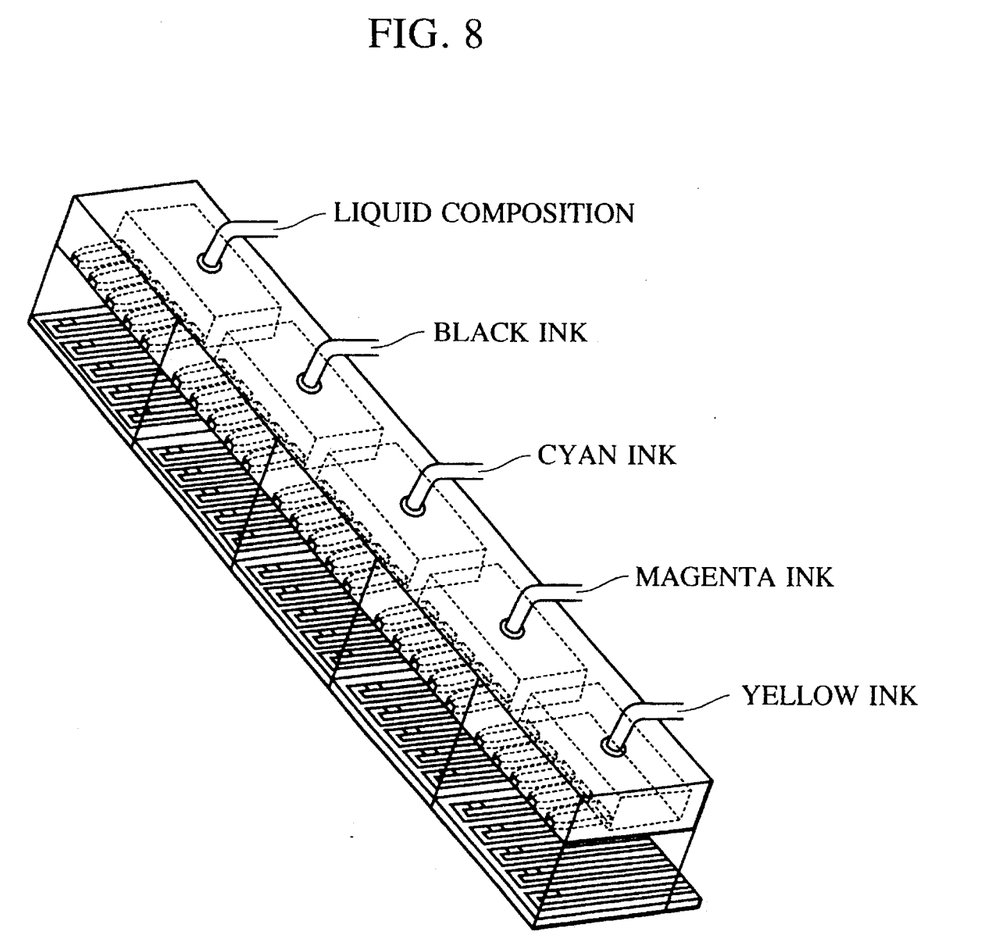
FIG. 8 is a perspective view of another recording head used in the present invention.

To perform the recording method of the present invention, for example, a recording apparatus comprising five recording heads as shown in FIG. 3, arranged on a carriage, may be used. FIG. 7 shows an example of such a recording apparatus wherein carriage 86 moves in the direction of arrow A. Recording heads 81, 82, 83 and 84 discharge inks of yellow, magenta, cyan and black, respectively, and head 85 discharges the colorless liquid composition. The heads are disposed in the recording apparatus so as to respectively discharge color inks in response to recording signals. The colorless liquid composition is previously adhered to at least a portion of recording paper to which each of the color inks will be adhered. The example shown in FIG. 5 uses five recording heads, but a recording apparatus suitable for use in the present invention is not limited to this apparatus. It is also possible to use a single recording head which is divided to form liquid passages for yellow, magenta, cyan and black inks and for the colorless liquid composition, as shown in FIG. 8.

A head may be, of course, arranged so that the recording order of the colorless liquid composition and the inks is reversed, namely, that the colorless liquid composition is discharged last.

EXAMPLES

The present invention is described in further detail below with reference to examples and comparative examples. In the description below, "parts" and "%" are "parts by weight" and "% by weight" unless stated otherwise. The peak of the molecular weight distribution of the cationic substance was measured by the GPC method using polyethylene oxide as a standard. The weight average molecular weight of the dispersant for the pigment ink was measured by the GPC method using styrene polymer as a standard, and the average particle size of the dispersant was measured by a dynamic light scattering method.

EXAMPLE 1

The components below were mixed and dissolved and then filtered under pressure by a membrane filter (trade mark: Fluoro Porefilter produced by Sumitomo Denko) having a pore size of 0.22 μm. The obtained filtrate was adjusted to pH 4.8 with NaOH to obtain liquid composition A of this example.

Components of liquid composition A

| | |
|---|---|
| Bishydroxyethylsulfone | 7.5 parts |
| Polyallylamine hydrochloride (PAA-HCL-3L, produced by Nitto-boseki, peak of molecular weight distribution = 10,000) | 1.5 parts |
| Thiodiglycol | 5 parts |
| Water | 86.0 parts |

(Production of ink I)

The components below were mixed and then filtered under pressure by a membrane filter (trade mark: Fluoro Porefilter, produced by Sumitomo Denko) having a pore size of 0.22 μm to obtain each of inks Y1, M1, C1 and B1 of yellow, magenta, cyan and black, each of which contained a dye having an anionic group. The thus-obtained inks Y1, M1, C1 and B1 are referred to as ink I hereinafter.

Yellow ink Y1

| | |
|---|---|
| C.I. Direct Yellow 142 | 2 parts |
| Thiodiglycol | 10 parts |
| Acethynol EH | 0.05 part |
| Water | 87.95 parts |

Magenta ink M1

| | |
|---|---|
| C.I. Acid Red 289 | 2.5 parts |
| Thiodiglycol | 10 parts |
| Acethynol EH | 0.05 part |
| Water | 87.45 parts |

Cyan ink C1

| | |
|---|---|
| C.I. Acid Blue 9 | 2.5 parts |
| Thiodiglycol | 10 parts |
| Acethynol EH | 0.05 part |
| Water | 87.45 parts |

Black ink B1

| | |
|---|---|
| C.I. Food Black 2 | 4.0 parts |
| Thiodiglycol | 10 parts |
| Acethynol EH | 0.05 part |
| Water | 85.95 parts |

An ink set of the present invention was formed by using liquid composition A and ink I obtained as described above, and used for recording on PPC (plain paper for copy machine) paper (produced by Canon). The recording apparatus as shown in FIG. 4 was used as an ink-jet recording apparatus, and five recording heads as shown in FIG. 7 were used for forming a color image. In this example, liquid composition A was first ejected and adhered to the recording paper, and thereafter ink I was adhered to the recording paper. The recording heads had a recording density of 360 dpi (dots per inch), and the driving frequency was 5 kHz. The head used for each of the yellow, magenta and cyan inks and the liquid composition had a droplet volume of 45 pl per dot, and the head used for the black ink had a droplet volume of 80 pl per dot.

These recording conditions were the same in the examples and comparative examples which respectively used inks described below.

EXAMPLE 2

An ink set of the present invention was formed by using liquid composition B, which was produced by the same method as liquid composition A and which comprised the components below, and ink I which contained as coloring materials the same dyes as those used in Example 1. Recording was performed on PPC paper (produced by Canon) under the same conditions as Example 1. In this example, in print recording, liquid composition B was first ejected and adhered to the recording paper, and thereafter ink I was adhered.

Components of liquid composition B

| | |
|---|---|
| Bishydroxyethylsulfone | 10 parts |
| Polyaminesulfone hydrochloride (PAS-A-5: produced by Nitoboseki, peak of molecular weight distribution = 3,500) | 2.5 parts |
| Benzalkonium chloride (Cation G-50: produced by Sanyokasei) | 2 parts |
| Thiodiglycol | 5 parts |
| Water | 80.5 parts |

EXAMPLE 3

An ink set of the present invention was formed by using liquid composition C, which was produced by the same method as liquid composition A and which comprised the components below, and ink I which contained as coloring materials the same dyes as those used in Example 1. Recording was performed on PPC paper (produced by Canon) under the same conditions as Example 1. In this example, in print recording, liquid composition C was first ejected and adhered to the recording paper, and thereafter ink I was adhered.

Components of liquid composition C

| | |
|---|---|
| Bishydroxyethylsulfone | 15 parts |
| Polyvinyl alcohol (produced by Aldrich Co. Ltd.,: peak of molecular weight distribution = 9,000–10,000) | 1.0 part |
| Cetyltrimethylammonium chloride (Rebon TM-16: produced by Sanyokasei) | 2 parts |
| Diethylene glycol | 5 parts |
| Water | 77.0 parts |

EXAMPLE 4

An ink set of the present invention was formed by using liquid composition D which comprised the components below, and ink I which contained as coloring materials the same dyes as those used in Example 1. Recording was performed on PPC paper (produced by Canon) under the same conditions as Example 1. In this example, in print recording, liquid composition D was first ejected and adhered to the recording paper, and thereafter ink I was adhered.

Components of liquid composition D

| | |
|---|---|
| Bishydroxyethylsulfone | 15 parts |
| Polyvinylpyrrolidone (PVP-K15, produced by International Specialty Chemicals, peak of molecular weight distribution = 8,000) | 3.0 parts |
| Benzyl tri-n-butylammonium chloride | 3 parts |
| Water | 74.0 parts |
| Diethylene glycol | 5 parts |

EXAMPLE 5

Inks Y2, M2, C2 and B2 of yellow, magenta, cyan and black, each of which contained a pigment and an anionic compound, were obtained by the following method: The inks Y2, M2, C2 and B2 are referred to as ink II and were used together with the liquid composition A used in Example 1 to form an ink set of this embodiment. Recording was performed on PPC paper (produced by Canon) by using the thus-formed ink set. In this embodiment, in print recording, liquid composition A was first ejected and adhered to the recording paper, and thereafter ink II was adhered to the recording paper. The recording head used had a recording density of 360 dpi, and the driving frequency was 5 kHz. The head used for each of the yellow, magenta and cyan inks and the liquid composition had a discharge volume of 45 pl per dot, and the head used for the black ink had a discharge volume of 60 pl per dot.

These recording conditions were the same in examples in which inks containing the dyes below were used. The environmental conditions for printing tests were standardized at 55% RH and 25° C.

(Production of ink II)

Black ink B2

Anionic polymer P-1 (styrene-methacrylic acid-ethyl acrylate, acid value 400, weight average molecular weight 6,000, an aqueous solution having a solids content of 20 %, neutralizer: potassium hydroxide) as a dispersant, and the materials below were charged in a batch-type vertical sand mill (produced by Aimex), and the mill was then filled with glass beads having a size of 1 mm as a medium, followed by dispersion treatment under cooling for 3 hours. After dispersion, the resultant dispersion had a viscosity of 9 cps and a pH of 10.0. The dispersion was placed in a centrifugal separator for removing coarse particles to obtain a carbon black dispersion having a weight average particle size of 100 nm.

(Composition of carbon black dispersion)

| | |
|---|---|
| P-1 aqueous solution (solids content 20%) | 40 parts |
| Carbon black Mogul L (produced by Cablack) | 24 parts |
| Glycerin | 15 parts |
| Ethylene glycol monobutyl ether | 0.5 part |
| Isopropyl alcohol | 3 parts |
| Water | 135 parts |

The thus-obtained dispersion was sufficiently agitated to obtain a black ink B2 containing a pigment for ink jet recording. The solids content of the final prepared product was about 10%.

Yellow ink Y4

Anionic polymer P-4 (styrene-acrylic acid-ethyl acrylate, acid value 140, weight average molecular weight 9,500, aqueous solution having a solids content of 20%, neutralizer: monoethanolamine) as a dispersant and the materials below were subjected to the same dispersion treatment as that used for producing black ink B2 to produce a yellow color dispersion having a weight average particle size of 103 nm.

(Composition of yellow dispersion)

| | |
|---|---|
| P-4 aqueous solution (solids content 20%) | 35 parts |
| C.I. Pigment Yellow 74 | 24 parts |
| Triethylene glycol | 15 parts |
| 2,3-butanediol | 2.0 parts |
| Isopropyl alcohol | 4 parts |
| Water | 135 parts |

The thus-obtained yellow dispersion was sufficiently agitated to obtain yellow ink Y2 containing a pigment for ink jet recording. The solids content of the final prepared product was about 10%.

Cyan ink C2

The same anionic polymer P-1 as that used as a dispersant for producing black ink B2 and the materials below were subjected to the same dispersion treatment as that used for the carbon black dispersion to produce a cyan color dispersion having a weight average particle size of 120 nm.
(Composition of cyan dispersion)

| | |
|---|---|
| P-1 aqueous solution (solids content of 20%) | 30 parts |
| C.I. Pigment Blue 15:3 (Fastoen Blue FGF, produced by Dainipon Ink Kagaku) | 24 parts |
| Glycerin | 15 parts |
| Diethylene glycol monobutyl ether | 0.5 part |
| Isopropyl alcohol | 3 parts |
| Water | 135 parts |

The thus-obtained cyan color dispersion was sufficiently agitated to obtain cyan ink C2 containing a pigment for ink jet recording. The solids content of the final prepared product was about 9.6%.

Magenta ink M2

The same anionic polymer P-1 as that used as a dispersant for producing black ink B2 and the materials below were subjected to the same dispersion treatment as that used for the carbon black dispersion to produce a magenta color dispersion having a weight average particle size of 115 nm.
(Composition of magenta color dispersion)

| | |
|---|---|
| P-1 aqueous solution (solids content of 20%) | 20 parts |
| C.I. Pigment Red 122 (produced by Dainipon Ink Kagaku) | 24 parts |
| Glycerin | 15 parts |
| Isopropyl alcohol | 3 parts |
| Water | 135 parts |

The thus-obtained magenta color dispersion was sufficiently agitated to obtain magenta ink M2 containing a pigment for ink jet recording. The solids content of the final prepared product was about 9.2%.

EXAMPLE 6

An ink set was formed by using ink II containing the pigments used in Example 5, and liquid composition B used in Example 2. Recording was performed on PPC paper (produced by Canon) by using the ink set under the same conditions as Example 5. In this example, in print recording, liquid composition B was first ejected and adhered to the recording paper, and thereafter ink II was adhered.

EXAMPLE 7

An ink set was formed by using ink II containing the pigments used in Example 5, and liquid composition C used in Example 3. Recording was performed on PPC paper (produced by Canon) by using the ink set under the same conditions as in Example 5. In this example, in print recording, liquid composition C was first ejected and adhered to the recording paper, and thereafter ink II was adhered.

EXAMPLE 8

An ink set was formed by using ink II containing the pigments used in Example 5, and liquid composition D used in Example 4. Recording was performed on PPC paper (produced by Canon) by using the ink set under the same conditions as in Example 5. In this example, in print recording, liquid composition D was first ejected and adhered to the recording paper, and thereafter ink II was adhered.

EXAMPLES 9 TO 16

In these examples, an ink set was formed by using each of the combinations of inks and liquid compositions used in Examples 1 to 8. Print recording was performed by the same method as Example 1 or 5 except that the ink was first adhered to recording paper, and the liquid composition was then ejected.

The combination of liquid composition and ink used in each of Examples 1 to 6, and the recording order of the liquid composition and ink are summarized in Table 1 below.

TABLE 1

Examples 1 to 16

| Example | Liquid composition | Ink | Recording order of liquid composition and ink |
|---|---|---|---|
| 1 | A | I | liquid composition, then ink |
| 2 | B | I | |
| 3 | C | I | |
| 4 | D | I | |
| 5 | A | II | |
| 6 | B | II | |
| 7 | C | II | |
| 8 | D | II | |
| 9 | A | I | ink, then liquid composition |
| 10 | B | I | |
| 11 | C | I | |
| 12 | D | I | |
| 13 | A | II | |
| 14 | B | II | |
| 15 | C | II | |
| 16 | D | II | |

Evaluation

The recorded image obtained in each of Examples 1 to 16 was evaluated on the basis of the criteria below.

1. Image density

A solid image was formed by using the liquid composition and black ink, and then allowed to stand for 12 hours, followed by measurement of reflection density by reflection density meter Macbeth RD915 (produced by Macbeth Co.). The evaluation criteria used were as follows:

⊚; reflection density of 1.30 or more o; reflection density of 1.25 to less than 1.30

Δ; reflection density of 1.15 to less than 1.25 x; reflection density of less than 1.15

2. Fixing property

After a solid red image was formed by using the liquid composition and the yellow and magenta inks, another white sheet was placed on the recorded image by its own weight. The time until the recorded image was not transferred to the back side of the sheet and did not produce smears was then measured, with time zero being the time at which recording ended, to evaluate the fixing property. The evaluation criteria used were as follows:

⊚; fixing property of less than 20 seconds o; fixing property of 20 to less than 30 seconds Δ; fixing property of 30 to less than 40 seconds x; fixing property of 40 seconds or more 3. Character quality Black alphameric characters were printed by using the liquid composition and black ink, and then visually evaluated. Characters with substantially no feathering were marked as ⊚, characters with feathering at a level which was slightly recognizable but would cause no practical problem were marked o, and characters with feathering at a higher level were marked as x.

4. Bleeding

Solid images were formed adjacent to each other using the liquid composition and yellow, magenta, cyan and black inks in the same printing mode as printing mode E (1 pass, one-direction printing) of Color Bubble Jet Printer BJC-820J produced by Canon. The degree of bleeding at boundaries between respective colors was visually observed. Substantially no bleeding was marked as ⊚, slight bleeding without practical problem was marked as o, and bleeding at higher levels was marked as x.

5. Water resistance

A solid image and alphameric characters were printed using each of the yellow, magenta, cyan and black color inks, allowed to stand for 1 hour and then immersed in tap water at a temperature of 20° C. for 10 seconds. The images and characters were then taken out or the water, air-dried and visually evaluated with respect to water resistance. Of the yellow, magenta, cyan and black inks, the evaluation of the ink exhibiting the lowest water resistance was considered as the evaluation result for water resistance. The criteria used for evaluation of water resistance were as follows:

o; The recording agent did not flow to a margin and there was substantially no smearing and substantially no bleeding of the alphameric characters.

o; The recording agent slightly flowed to a margin with slight bleeding of alphameric characters, at a level which would not present a practical problem.

x; The recording agent significantly flowed to a margin with noticeable smears and bleeding of the alphameric characters.

In the above evaluations, the liquid composition was adhered to the same region of the recording medium as the region where an image was formed by ink. The printing duties of the liquid composition and inks were 100% in all cases. Printing was performed in one direction.

The evaluation results of the images obtained in Examples 1 to 16 with respect to the above-described tests are shown in Table 2. As shown by Table 2, in the examples of the invention, images excellent in fixing property, character quality, image density, bleeding and water resistance were obtained.

TABLE 2

| | Evaluation Results | | | | |
|---|---|---|---|---|---|
| | Image density | Fixing property | Character quality | Bleeding | Water resistance |
| Example 1 | ⊚ | o | ⊚ | ⊚ | ⊚ |
| Example 2 | ⊚ | o | ⊚ | ⊚ | ⊚ |
| Example 3 | ⊚ | o | ⊚ | ⊚ | o |
| Example 4 | ⊚ | o | ⊚ | ⊚ | o |
| Example 5 | ⊚ | o | ⊚ | ⊚ | ⊚ |
| Example 6 | ⊚ | o | ⊚ | ⊚ | ⊚ |
| Example 7 | ⊚ | ⊚ | ⊚ | ⊚ | ⊚ |
| Example 8 | ⊚ | o | ⊚ | ⊚ | ⊚ |
| Example 9 | ⊚ | o | o | o | ⊚ |
| Example 10 | ⊚ | ⊚ | o | o | ⊚ |
| Example 11 | ⊚ | ⊚ | o | o | o |
| Example 12 | ⊚ | o | o | o | o |
| Example 13 | ⊚ | ⊚ | ⊚ | o | ⊚ |
| Example 14 | ⊚ | o | ⊚ | o | ⊚ |
| Example 15 | ⊚ | ⊚ | ⊚ | o | ⊚ |
| Example 16 | ⊚ | o | ⊚ | o | ⊚ |

EXAMPLE 17

In order to examine the discharge durability of the liquid composition, a discharge test ($2\times10^9$ pulses) of the liquid composition was performed by using a thermal ink-jet recording head, and the presence of a difference between the discharges from the recording head before and after the test was evaluated. Liquid compositions A, B, C and D used in Examples 1 to 4 were used as liquid compositions.

The discharge amount was measured from a change in weight of the liquid composition by application of $2\times10^9$ pulses, and the discharge amounts before and after the durability test were compared. The results obtained are shown in Table 3. As seen from the results shown in Table 3, even after application of $2\times10^9$ pulses, the discharge amount was decreased by less than 10%, and good durability was thus exhibited.

TABLE 3

| | Evaluation result | |
|---|---|---|
| Liquid composition | Discharge before test [ng/dot] | Discharge after test [ng/dot] |
| A | 45.6 | 42.8 |
| B | 44.8 | 41.9 |
| C | 44.2 | 42.1 |
| D | 44.0 | 42.5 |

As described above, the present invention can provide images having a fast fixing property, good print quality and good image density, solid images having high uniformity, and high-definition images having no bleeding and good color reproducibility. The invention also can provide excellent ink-jet recorded images having the above excellent properties and completely satisfactory water-resistance.

The present invention can further prevent burning of an organic compound contained in the liquid composition onto the heating head and an image-forming method which thereby improves the durability of the recording head used.

While the present invention has been described with respect to what is presently considered to be the preferred embodiments, it is to be understood that the invention is not limited to the disclosed embodiments. The modifications and equivalent arrangements included within the spirit and scope of the appended claims.

What is claimed is:

1. A liquid composition comprising a cationic substance and bishydroxyethylsulfone.

2. A liquid composition comprising a cationic substance having a molecular weight distribution with a peak within the molecular weight range of 1000 or less, and bishydroxyethylsulfone.

3. A liquid composition according to claim 2, further comprising a cationic substance having a molecular weight distribution with a peak within the molecular weight range of 1500 to 10000.

4. A liquid composition according to claim 1, comprising 5 to 40% by weight of said bishydroxyethylsulfone.

5. A liquid composition according to claim 1, wherein said cationic substance has a molecular weight distribution with a peak within the molecular weight region of 100 to 700.

6. A liquid composition according to claim 1, further comprising a nonionic polymer.

7. A liquid composition according to claim 1, comprising 0.05 to 20% by weight of said cationic substance.

8. A liquid composition according to claim 1, further comprising a water-soluble organic solvent.

9. A liquid composition according to claim 1, wherein said cationic substance is a surfactant.

10. An ink set comprising a combination of a liquid composition according to any one of claims 1 to 9 and at least one ink selected from the group consisting of yellow, magenta, cyan, black, red, blue and green inks.

11. An ink set comprising a combination of a liquid composition according to any one of claims 1 to 9, yellow ink, magenta ink and cyan ink.

12. An ink set comprising a combination of a liquid composition according to any one of claims 1 to 9, yellow ink, magenta ink, cyan ink and black ink.

13. An ink set according to claim 10, wherein the ink or each of the inks contains an anionic compound.

14. An ink set according to claim 10, wherein the ink or each of the inks contains a water-soluble dye having an anionic group.

15. An ink set according to claim 10, wherein the ink or each of the inks contains a pigment and an anionic compound.

16. An image-forming method comprising:

step (A) of adhering a liquid composition according to any one of claims 1 to 9 to at least an image-forming region of a recording medium; and step (B) of applying an ink containing at least an anionic compound to said recording medium by an ink-jet process.

17. An image-forming method according to claim 16, wherein said ink-jet process is an on-demand type ink-jet process.

18. An image-forming method according to claim 16, wherein said liquid composition is adhered to said recording medium by an ink-jet process.

19. An image-forming method according to claim 16, wherein said ink-jet process is an ink-jet process wherein heat energy is applied to the ink.

20. An image-forming method according claim 16, wherein step (A) is performed before step (B).

21. An image-forming method according to claim 16, wherein step (A) is performed after step (B).

22. An image-forming apparatus comprising an ink set according to claim 10, and ink-jet means.

23. An image-forming apparatus comprising a first recording unit having means for containing a liquid composition according to any one of claims 1 to 9, and means for discharging said liquid composition, and a second recording unit having means for containing an ink containing at least an anionic compound and means for discharging said ink.

24. An image-forming apparatus according to claim 23, wherein said means for discharging ink is ink-jet means.

25. An image-forming apparatus according to claim 22, wherein said ink-jet means is means for forming ink droplets by applying heat energy to an ink.

26. An image-forming apparatus according to claim 24, wherein said ink-jet means is means for forming ink droplets by applying heat energy to an ink.

* * * * *

UNITED STATES PATENT AND TRADEMARK OFFICE
CERTIFICATE OF CORRECTION

PATENT NO. : 5,549,740
DATED : August 27, 1996
INVENTOR(S) : KATSUHIKO TAKAHASHI, ET AL.

It is certified that error appears in the above-indentified patent and that said Letters Patent is hereby corrected as shown below:

COLUMN 8:

Line 4, "contains" should read --contain--.
      Line 10, "to" should be deleted.

COLUMN 13:

Line 1, "ink bag-containing 40" should read --ink-containing portion 40--.

Signed and Sealed this

Fourteenth Day of January, 1997

Attest:

BRUCE LEHMAN

Attesting Officer      Commissioner of Patents and Trademarks